(12) United States Patent
Xiao et al.

(10) Patent No.: US 7,841,102 B2
(45) Date of Patent: Nov. 30, 2010

(54) MEASUREMENT APPARATUS

(75) Inventors: Shi-Xin Xiao, Shenzhen (CN);
Chung-Yuan Chen, Taipei Hsien (TW);
Long-Fong Chen, Taipei Hsien (TW)

(73) Assignees: Hong Fu Jin Precision Industry Co., Ltd., Shenzen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 184 days.

(21) Appl. No.: 12/247,993

(22) Filed: Oct. 8, 2008

(65) Prior Publication Data

US 2009/0094851 A1    Apr. 16, 2009

(30) Foreign Application Priority Data

Oct. 12, 2007    (CN) .................. 2007 1 0202043

(51) Int. Cl.
*G01B 5/00* (2006.01)

(52) U.S. Cl. .......................................... 33/832; 33/813

(58) Field of Classification Search ........... 33/832–833, 33/813, 823, 828
See application file for complete search history.

(56) References Cited

U.S. PATENT DOCUMENTS

| | | | | |
|---|---|---|---|---|
| 1,416,810 A | * | 5/1922 | Foster | 33/637 |
| 2,539,597 A | * | 1/1951 | Staples | 359/394 |
| 2,551,242 A | * | 5/1951 | Burwinkle | 33/709 |
| 2,686,975 A | * | 8/1954 | Geipel | 33/555.3 |
| 2,766,531 A | * | 10/1956 | Egli | 33/838 |
| 2,994,963 A | * | 8/1961 | Turner | 33/501.05 |
| 3,525,255 A | * | 8/1970 | Orr, Jr. | 73/64.48 |
| 4,106,240 A | * | 8/1978 | De Bartolo | 451/278 |
| 4,240,207 A | * | 12/1980 | Benjamin et al. | 33/639 |
| 2008/0155846 A1 | | 7/2008 | Li et al. | |

* cited by examiner

*Primary Examiner*—G. Bradley Bennett
*Assistant Examiner*—Tania C Courson
(74) *Attorney, Agent, or Firm*—Frank R. Niranjan

(57) ABSTRACT

A measurement apparatus for measuring a distance between a base surface and an upper surface of a stepped structure of a workpiece. The measurement apparatus includes a supporting member having an upper surface for supporting the workpiece, a holding member fixed on the top surface, and a micrometer. The holding member includes a reference platform and a depression formed on the reference platform and facing the upper surface. The micrometer is fixed to the holding member and includes an extendable measuring shaft with a contacting portion extending out of the reference platform. The distance is measured by pushing the workpiece into the depression until the base surface make contact with the reference platform.

7 Claims, 4 Drawing Sheets

MEASUREMENT APPARATUS

BACKGROUND

1. Field of the Invention

The present invention relates to a measurement apparatus for measuring distance between two surfaces of a stepped structure.

2. Description of Related Art

An altimeter is usually used to measure distance between a base surface and an upper surface of a stepped structure of a workpiece. The altimeter includes an adjustable measuring arm, a zero reset button, a scale, and so on. To take the measurement, the measuring arm is held on the base surface, and the zero reset button is pressed down to have the pointer of the scale aim at "0". The measuring arm is next moved to the upper surface, and the scale will show a value of the distance between the base surface and the upper surface.

However, using the above methodology is too slow because of moving the measuring arm from the base surface to the upper surface.

Therefore a need exist for a measurement apparatus that can be quickly to measure the distance between the base surface and the upper surface.

SUMMARY

A measurement apparatus for measuring a distance between a base surface and an upper surface of a stepped structure of a workpiece. The measurement includes a supporting member including an upper surface for supporting the workpiece, a holding member fixed on the top surface, and a micrometer. The holding member includes a reference platform touching the base surface and a depression form on the reference platform and facing the upper surface. The micrometer fixes on the holding member including an extendable measuring shaft with a contacting portion extending out of the reference platform. The reference platform contacts with the upper surface and is pushed by the workpiece.

Other systems, methods, features, and advantages of the present measurement apparatus will be or become apparent to one with skill in the art upon examination of the following drawings and detailed description. It is intended that all such additional systems, methods, features, and advantages be included within this description, be within the scope of the present apparatus, and be protected by the accompanying claims.

DETAILED DESCRIPTION

Figure 1:
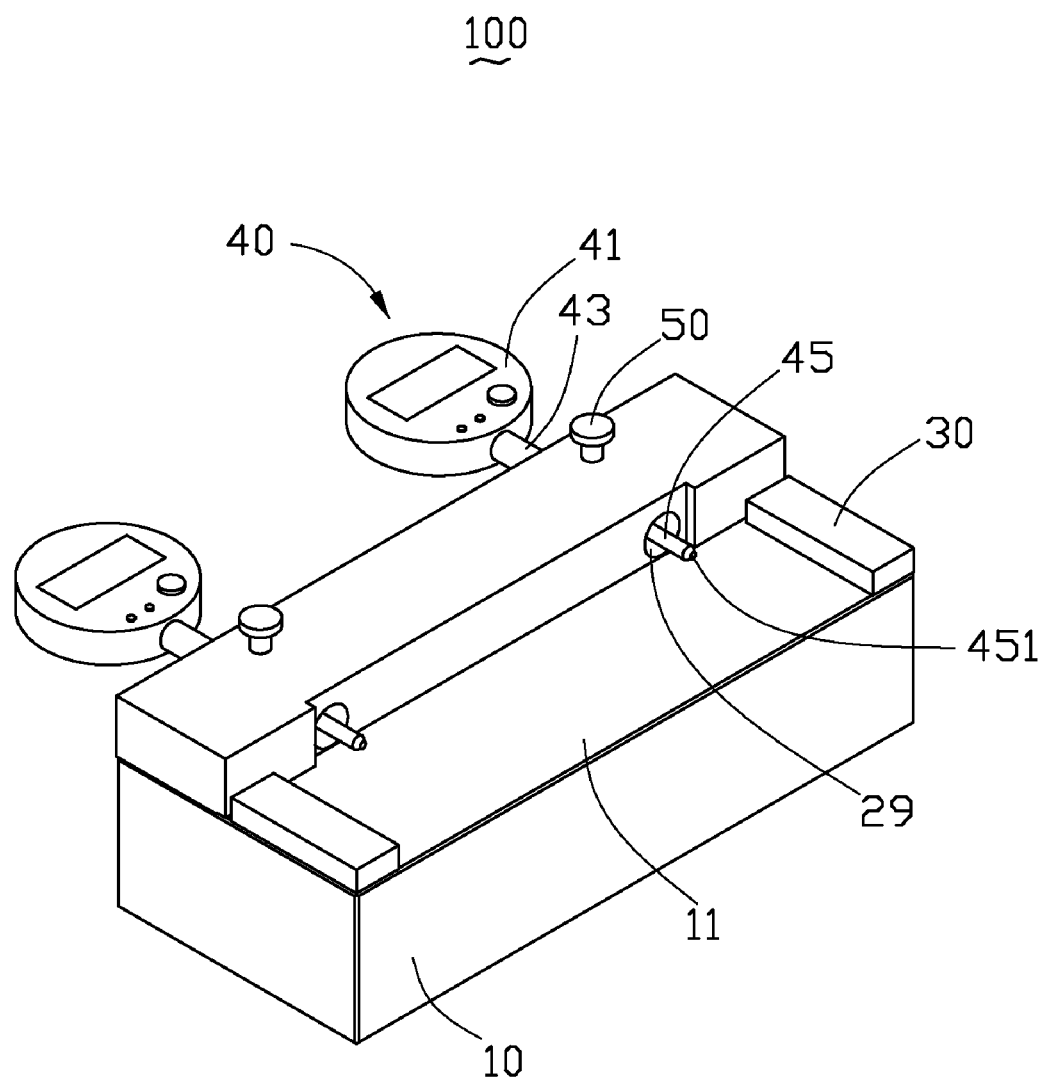
FIG. 1 is an isometric view of a measurement apparatus.
Figure 2:
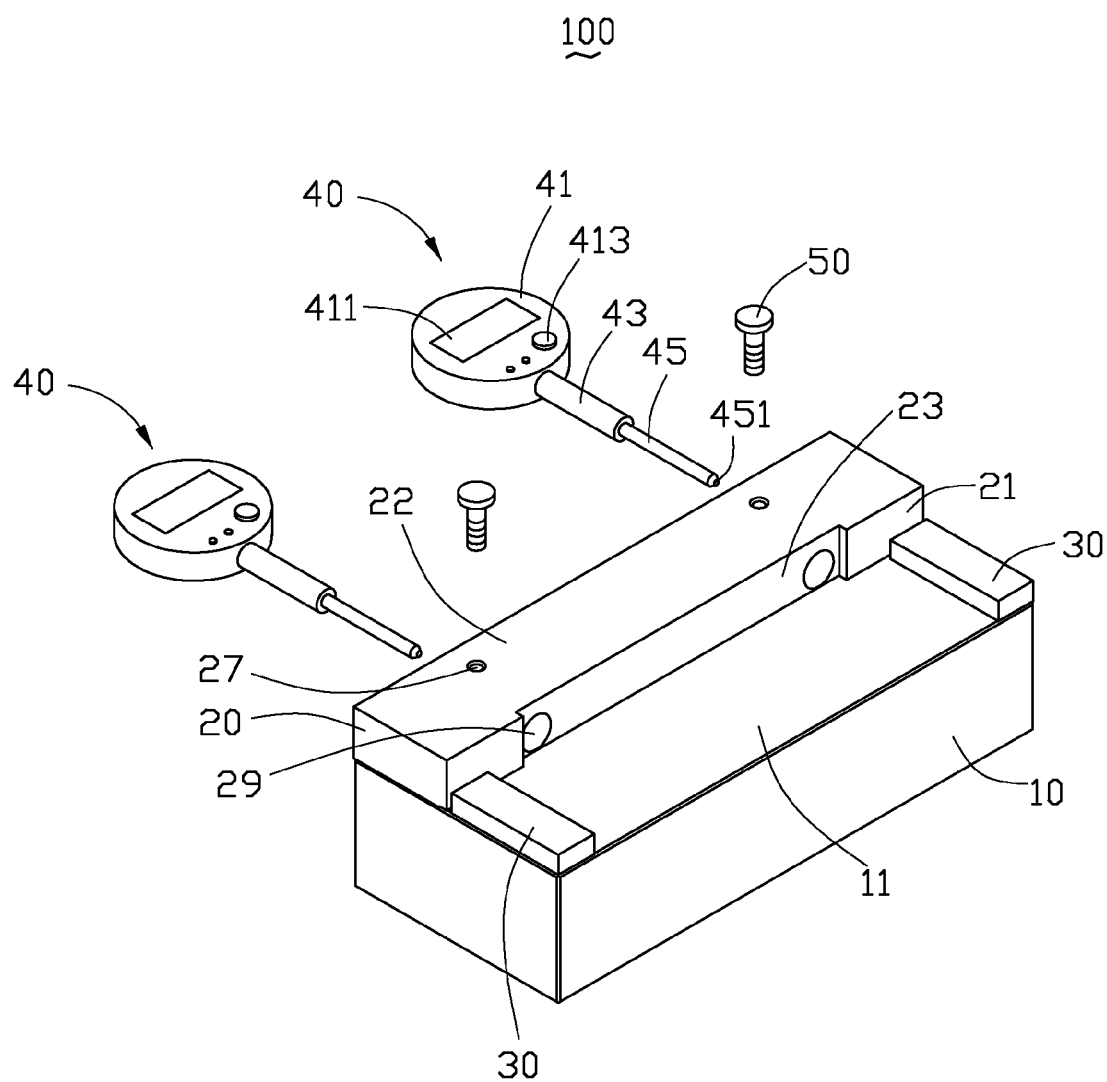
FIG. 2 is an exploded perspective view of the measurement apparatus.

Referring to FIGS. 1 and 2, the measurement apparatus 100 includes a supporting member 10, a holding member 20 fixed on the supporting member 10, two blocking members 30 disposed on the supporting member 10, two micrometers 40 mounting on the holding member 20, and two fastening members 50 for fastening the micrometers 40.

The supporting member 10 has a flat top surface 11. The holding member 20 is disposed on the top surface 11 and occupies a part of the top surface 11. The holding member 20 has a reference platform 21. The center portion of the reference platform 21 is a depression 23. The top surface 22 of the holding member 20 defines two fixing holes 27 and the fastening member 50 are inserted into these holes 27. The holding member 20 defines two through holes 29 along a direction perpendicular to the reference platform 21. The two fixing holes 27 intersect with the two through holes 29 respectively.

The two parallel blocking members 30 are rectangular blocks. The two blocking members 30 are disposed on the top surface 11 near the reference platform 21 of the holding member 20.

The two micrometers 40 are fastened on the holding member 20 by the two fastening members 50. As the two micrometers 40 have similar structures and functions, only one of the two micrometers 40 will be described hereinafter. The micrometer 40 includes a main body 41, a sleeve 43, and an extendable measuring shaft 45.

The sleeve 43 extends out from the main body 41. The measuring shaft 45 has a contacting portion 451 at one end. The measuring shaft 45 passes through the sleeve 43 and extends into the main body 41 with the contacting portion 451 protrudes out of the sleeve 43. The main body 41 includes a dial plate 411 and a zero reset button 413. The dial plate 411 is configured for displaying a value of a distance moved by the contacting portion 451. The zero reset button 413 is used for establishing a zero reference level that provide a basis for measurement.

In assembly, firstly, the holding member 20 is mounted on the part of the top surface 11 of the supporting member 10, and the two parallel blocking members 30 are fixed on the top surface 11 and near the reference platform 21 of the holding member 20. Secondly, the sleeves 43 of the micrometers 40 are inserted into the through holes 29 from a side opposite to the reference platform 21 of the holding member 20 respectively, with the measuring shafts 45 extending out of the reference platform 21. Thirdly, the fixing members 50 are screwed into the fixing holes 27 to fasten the sleeves 43 therein respectively.

Figure 3:
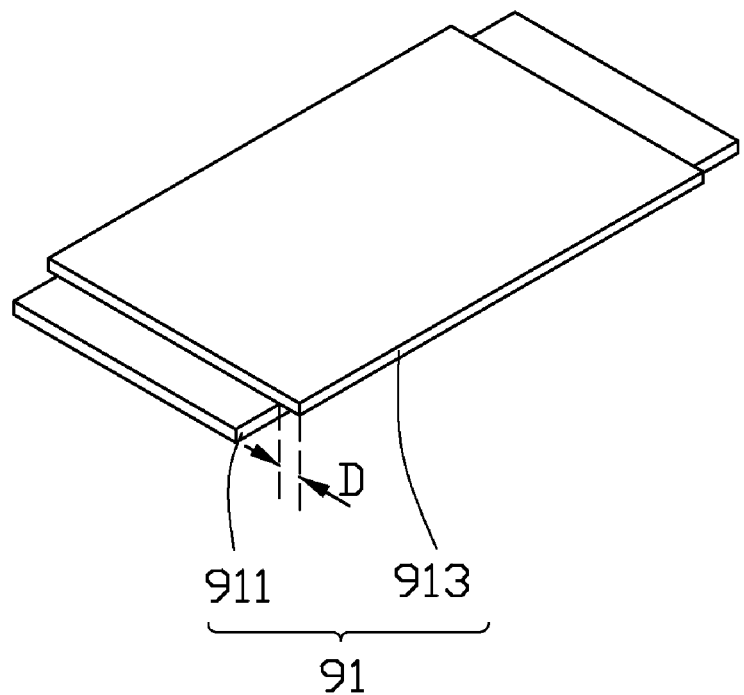
FIG. 3 is an isometric view of a workpiece measured by the measurement apparatus.

Referring to FIG. 3, the workpiece 90 includes a stepped structure 91. The stepped structure 91 has a base surface 911 and an upper surface 913. The measurement apparatus 100 is used for measuring distance D between the base surface 911 and the upper surface 913.

Figure 4:
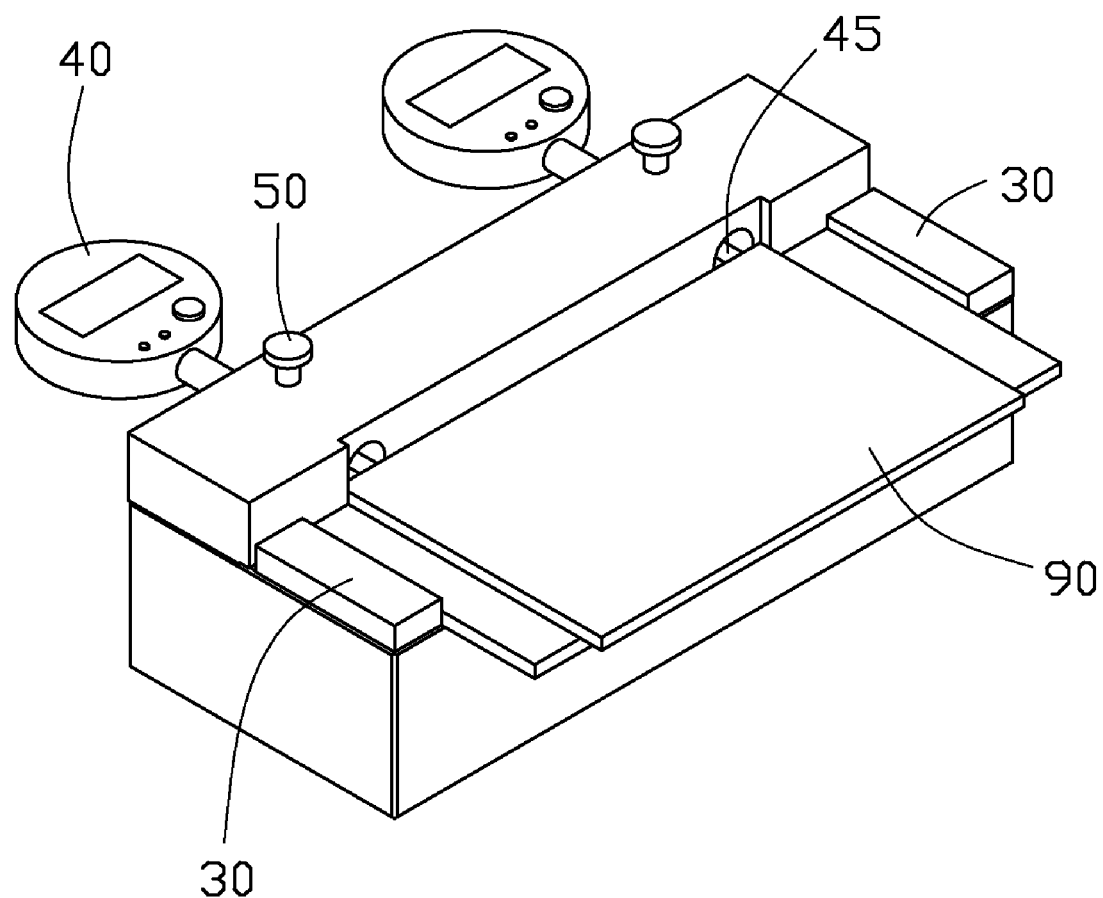
FIG. 4 is an isometric view showing the measurement apparatus measuring the workpiece.

Referring to FIGS. 2, 3, and 4, when measuring a workpiece with the measurement apparatus 100: Firstly, the contacting portion 451 is pushed to reach the reference platform 21, and then the zero reset button 413 is pressed to establish a zero reference level. Secondly, the workpiece 90 is disposed on the top surface 11 and between the two blocking members 30, with the base surface 911 and the upper surface 913 facing the reference platform 21. Thirdly, the workpiece 90 is pushed toward the holding member 20, guided and slid between the two blocking members 30, as a result, the upper surface 913 of the workpiece would push against the contacting portion 451 of the measuring shaft 45 until the base surface 911 abuts the reference platform 21. Therefore, the upper surface 913 would project into the depression 23, and the dial plate 411 will show the value of the distance D between the base surface 911 and the upper surface 913. Therefore, there is no need to move the measuring shaft 45 from the base surface 911 to the upper surface 913, and the distance D between the base surface 911 and the upper surface 913 of the stepped structure 91 can be measured quickly.

What is claimed is:

1. A measurement apparatus for measuring a distance between a base surface and an upper surface of a stepped structure of a workpiece, the measurement apparatus comprising:
   - a supporting member comprising a top surface for supporting the workpiece;
   - a holding member fixed on the top surface, the holding member comprising a reference platform and a depression formed in the reference platform and facing the upper surface; and
   - a micrometer fixed on the holding member comprising an extendable measuring shaft with a contacting portion extending out of the reference platform;
   - wherein the extendable measuring shaft is pushed by the workpiece until the reference platform contacts the base surface.

2. The measurement apparatus as claimed in claim 1, further comprising two parallel blocking members fixed on the top surface at the side of the reference platform for guiding the workpiece.

3. The measurement apparatus as claimed in claim 1, further comprising a fastening member for fixed the micrometer to the holding member.

4. The measurement apparatus as claimed in claim 3, wherein the micrometer comprises a main body and a sleeve extending from the main body, and the measuring shaft passes through the sleeve and extends into the main body, with the contacting portion extending out of the sleeve.

5. The measurement apparatus as claimed in claim 4, wherein the holding member defines a fixing hole for allowing the fastening member to pass through and a through hole intersecting with the fixing hole for receiving the sleeve, the micrometer is fixed to the holding member by the fastening member being fastened to the fixing hole and pressing against the sleeve.

6. A measurement apparatus comprising:
   - a supporting member comprising a top surface;
   - a holding member fixed on the top surface, comprising a reference platform and a depression formed on the reference platform;
   - a micrometer fixed on the holding member comprising an extendable measuring shaft with a contacting portion extending out of the reference platform.

7. The measurement apparatus as claimed in claim 6, further comprising two parallel blocking members fixed on the top surface and at the side of the reference platform.

* * * * *